Aug. 25, 1925.  R. KROEDEL  1,551,107
FOCUSING DEVICE FOR PHOTOGRAPHIC CAMERAS
Filed Feb. 24, 1925  2 Sheets-Sheet 1
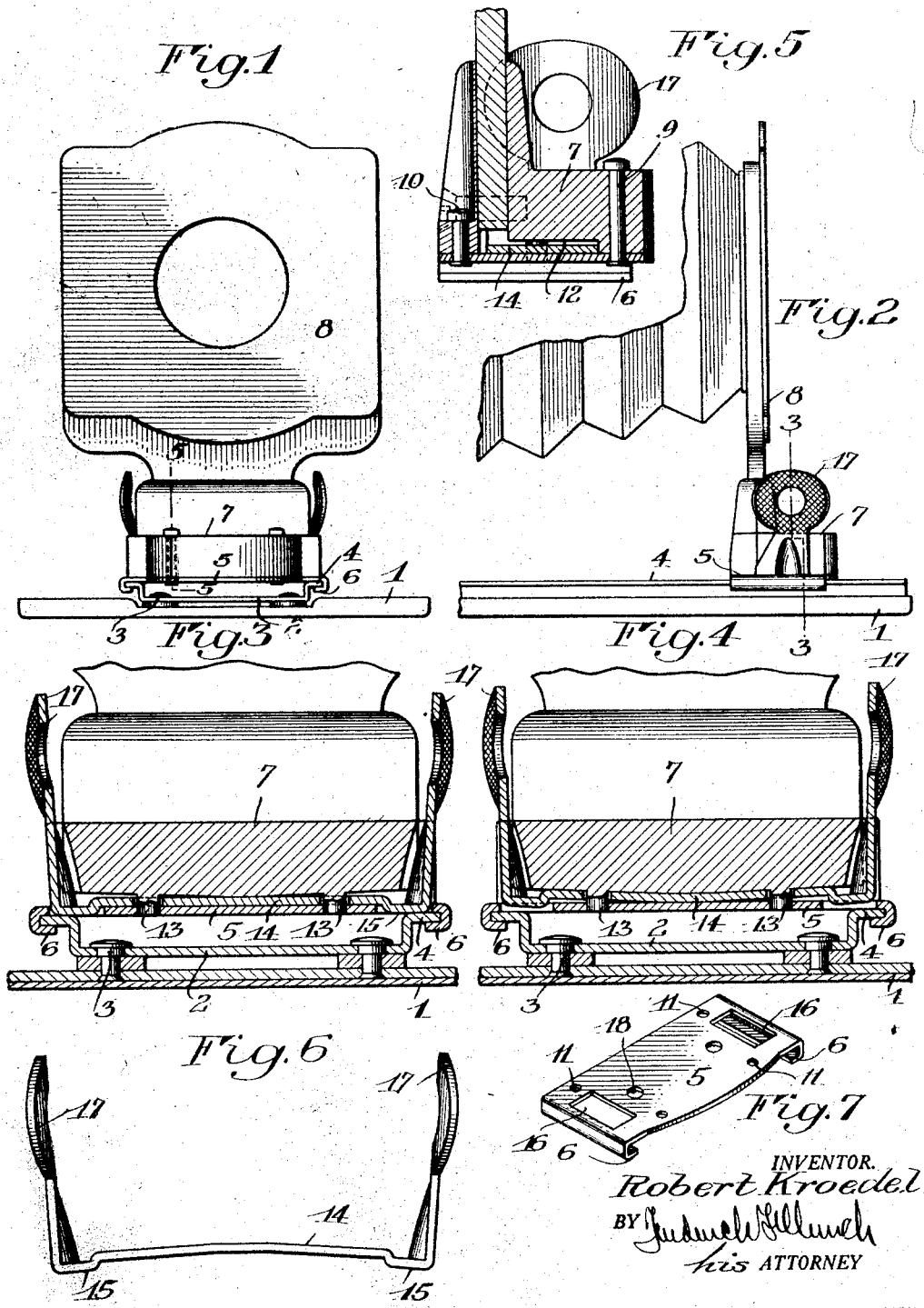

Inventor
Robert Kroedel

Patented Aug. 25, 1925.

1,551,107

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FOCUSING DEVICE FOR PHOTOGRAPHIC CAMERAS.

Application filed February 24, 1925. Serial No. 11,088.

*To all whom it may concern:*

Be it known that I, ROBERT KROEDEL, a citizen of the United States, residing at Rochester, in the county of Monroe and State of New York, have invented certain new and useful Improvements in Focusing Devices for Photographic Cameras; and I do hereby declare the following to be a full, clear, and exact description of the same, reference being had to the accompanying drawings, forming a part of this specification, and to the reference numerals marked thereon.

My present invention relates to photography and more particularly to photographic cameras and it has for its object to provide a simple, compact and efficient focusing device whereby the lens carriage and front may be moved to different positions on the camera bed and there securely clamped. The improvements are directed in part toward the construction of the slide block or carriage itself and toward the clamping and releasing means thereon provided, the latter being of particularly novel construction. To these and other ends the invention resides in certain improvements and combinations of parts all as will be hereinafter more fully described, the novel features being pointed out in the claims at the end of the specification.

In the drawings:

Figure 1 is a front elevation of a camera front and bed constructed in accordance with and illustrating one embodiment of my invention;

Figure 2 is a side elevation thereof with the bed and bellows broken away;

Figure 3 is an enlarged section through the carriage and bed taken substantially on the line 3—3 of Figure 2 and showing the clamping means in operative position;

Figure 4 is a similar view with the clamping means in released position;

Figure 5 is an enlarged fragmentary section on the line 5—5 of Figure 1;

Figure 6 is an enlarged detail view of the clamping plate;

Figure 7 is a perspective view of the slide plate;

Similar reference numerals throughout the several views indicate the same parts.

Figure 8:
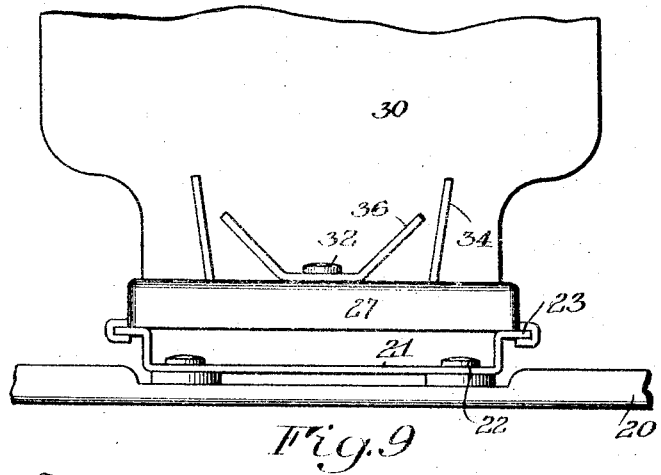
Figure 8 is a front elevation of a lens carriage and bed showing a modified embodiment of the invention, the lens board and bed being broken away.

My invention is particularly applicable to folding or pocket cameras in which the lens front carrying the bellows is drawn back and forth on an extension bed and I have shown it embodied in this type of construction. Referring first to the embodiment shown in Figures 1 to 7 inclusive 1 indicates a camera bed and 2 a track plate secured thereto by rivets 3. The edges of the track plate are upwardly and outwardly flanged to form the horizontal tracks 4. Fitting over the track plate and resting thereon is a slide plate 5 of complementary formation. The ends of this transverse plate are bent downwardly and inwardly to interlock in close sliding engagement with the tracks 4 as shown at 6.

This slide plate 5 carries the carriage block 7 on which in turn is mounted the lens board or front 8. The block and plate are secured rigidly together by rivets 9 and 10 best shown in Figure 5 and which pass through the openings 11 shown in Figure 7. In the center of the block 7, a transverse recess 12 is formed in its under side making a groove or chamber closed by the slide plate 5. Its top wall is inclined downwardly toward the center from both sides as shown in Figure 7 with two depending lugs or pins 13 formed at each side of the center.

The cavity or chamber 12 is occupied by a bent spring plate 14 of the upwardly bowed shape shown in Figure 6. That is, it is of that shape when removed and not confined within the cavity 12. When occupying the cavity it is held under compression between the slide plate 5 and the block 7 as shown in Figure 3. It is not wholly compressed, however, and its ends are under a downward spring tension. They are offset to form clamping surfaces 15 which project through openings 16 in the plate 5 and frictionally engage the upper surfaces of the tracks 4 in opposition to the flanges 6 of the slide plate 5 to lock the carriage to the tracks. The clamps are released by pressing together two upwardly extending finger pieces 17 forming continuations of the spring plate 14 as shown in Figure 4 and with this same releasing grip the carriage may be moved back and forth upon the bed. In so pinching together the finger grips the bow of the spring plate 14 is reversed, the center point of the top wall of the cavity 12 acting as a fulcrum, as clearly shown in Figure 4. The pins or projections 13 on the block 7 serve to center the spring plate 14 by engaging in openings 18 therein. These openings are slightly larger than the pins to permit the plate to flex.

A carriage constructed as above locks the front very effectively in any position and is extremely durable besides which the whole device may be made substantially of sheet metal stampings that are easily assembled.

Figure 9:
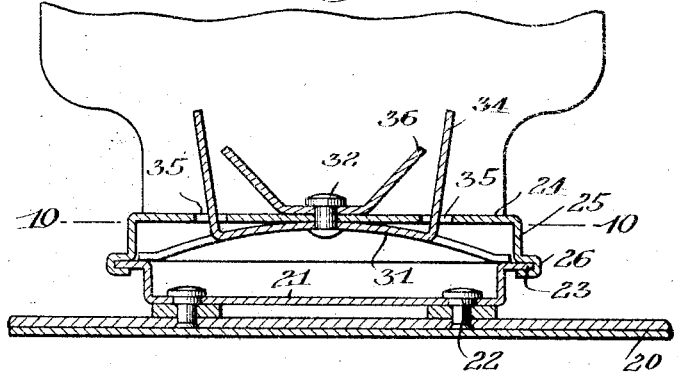
Figure 9 is a central transverse section through the construction of Figure 8.
Figure 10:
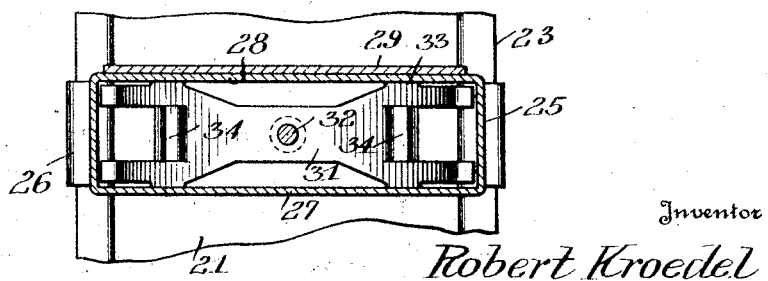
Figure 10 is a horizontal section through the carriage taken on the line 10—10 of Figure 9.

Referring now to Figures 8, 9 and 10 and the embodiment of the invention there shown, 20 indicates the camera bed as before and 21 the track plate secured thereto at 22 and having the track flanges 23. The carriage block 24 is of sheet metal construction and becomes both carriage block and slide plate being provided with downwardly turned flanges 25 that are hooked at 26 to both engage over and upon the tracks 23 and abut them underneath providing substantially the same sliding contact as in the other embodiment. This gives the slide plate 24 the box like appearance of a carriage block particularly as the plate 24 is also flanged downwardly at the front as shown at 27 while at the rear it is flanged downwardly at 28 and then doubled upwardly at 29 to form the lens board 30. The clamping mechanism of the carriage is housed within this box.

This clamping mechanism consists essentially of an upwardly bowed clamping plate 31 secured at its center by a rivet 32 to plate 24 and having lugs or contact members 33 at its sides that ride against the inside faces of the flanges 27 and 28. The ends of the plate ride against the upper surfaces of the tracks 23 and clamp against them, the plate being normally under compression. As the tension reacts against the plate 24, the tracks are gripped between the hooks 26 and the spring.

To release the clamp two upwardly extending finger pieces 34 are pinched together as before and the carriage manipulated through this means. The finger pieces are preferably formed from extensions of the spring plate 31 struck up from the center portions of both ends as shown in Figure 10 and passing through openings 35 in the slide plate 24. To limit their inward movement a stop plate 36 having outwardly turned ends is secured by the rivet 32 to plate 24.

This embodiment of the invention is an entirely sheet metal construction, is light, durable and effective in operation while the assembled parts are all fastened by the rivet 32.

I claim as my invention:

1. The combination with a camera bed having tracks thereon, of a carriage embodying a slide plate engaging the tracks on one side and a bowed clamping spring held at its center to the carriage and having its ends normally engaging the other sides of the tracks under tension to hold the carriage in adjusted position.

2. The combination with a camera bed having tracks thereon, of a carriage embodying a slide plate engaging the tracks on one side, a bowed clamping spring held at its center to the carriage and having its ends normally engaging the other sides of the tracks under tension to hold the carriage in adjusted position, and exteriorly arranged finger pieces connected to the clamping plate at opposite sides of its center and adapted when pressed together to straighten the plate and remove its tension on the tracks.

3. The combination with a camera bed having tracks thereon, of a carriage embodying a slide plate engaging the tracks on one side, a bowed clamping spring held at its center to the carriage and having its ends normally engaging the other sides of the tracks under tension to hold the carriage in adjusted position, and exteriorly arranged finger pieces connected to the clamping plate at opposite sides of its center and adapted when pressed together to straighten the plate and remove its tension on the tracks, said finger pieces being struck up as integral extensions of the clamping plate.

4. The combination with a camera bed having laterally flanged tracks thereon, of a carriage embodying a slide plate having hook shaped slides engaging the track flanges and a bowed clamping spring held at its center to the carriage and having its ends normally engaging the tracks under tension to hold the carriage in adjusted position.

5. The combination with a camera bed having tracks thereon, of a carriage embodying a slide engaging the tracks on one side, said carriage being provided with a housing on its under side and a bowed clamping spring held to the carriage at its center within the housing and having its ends normally engaging the tracks under tension in opposition to the slides to hold the carriage in adjusted position.

6. The combination with a camera bed having tracks thereon, of a carriage embodying a carriage block having a recess on its under side, a slide plate secured to the bottom of the carriage block and having slides engaging the tracks and a bowed clamping spring held in the recess between the slide plate and the carriage block and engaging the tracks in opposition to the slides to hold the carriage in adjusted position.

7. The combination with a camera bed having tracks thereon, of a carriage embodying a carriage block having a recess on its under side, a slide plate secured to the bottom of the carriage block and having slides engaging the tracks and a bowed clamping spring held in the recess between the slide plate and the carriage block and engaging the tracks in opposition to the slides to hold the carriage in adjusted position, the ends of the clamping plate being bent upwardly laterally of the carriage block and being adapted when pinched together to relieve the tension of the spring clamping plate from the tracks.

ROBERT KROEDEL.